United States Patent [19]

Olsen et al.

[11] 3,905,608

[45] Sept. 16, 1975

[54] HIGH PRESSURE SEAL

[75] Inventors: John H. Olsen, Vashon; Benjamin A. Thomas, Burton, both of Wash.

[73] Assignee: Flow Research, Inc., Kent, Wash.

[22] Filed: Dec. 26, 1973

[21] Appl. No.: 427,439

[52] U.S. Cl. .............................................. 277/188
[51] Int. Cl. .............................................. F16j 15/06
[58] Field of Search ...................... 277/188, 189, 165

[56] References Cited
UNITED STATES PATENTS

| | | | |
|---|---|---|---|
| 2,973,978 | 3/1961 | Oppenheim | 277/188 |
| 3,172,670 | 3/1965 | Pras | 277/188 |

*Primary Examiner*—Robert I. Smith
*Attorney, Agent, or Firm*—Graybeal, Barnard, Uhlir & Hughes

[57] ABSTRACT

A high pressure seal assembly having a forward high pressure side and a rear low pressure side, and arranged to seal the interface between a housing and a piston. There is a rearmost metal backup ring, next a relatively high yield strength seal ring, a lower yield strength seal ring just forward of the high yield strength ring, and a forward retaining ring. At the forward outer circumferential edge of the low yield strength seal ring, there is an annular groove in which is mounted a compressible O-ring that presses the forward portion of the low yield strength ring against the reciprocating piston, and an outer metal anti-extrusion ring surrounds the high yield strength ring. The rear backup ring is fixedly mounted between two housing sections in a manner that in initial installation the position of the backup ring can be adjusted laterally to accomodate for any misalignment between the piston and housing and yet have a close fit with respect to the piston.

8 Claims, 2 Drawing Figures

HIGH PRESSURE SEAL

BACKGROUND OF THE INVENTION

1. Field of the Invention

The present invention relates to a seal, adapted to provide an effective fluid seal at pressures as high as 50 to 100,000 pounds per square inch.

2. Description of the Prior Art

In providing a high pressure seal in an apparatus such as a high pressure fluid intensifier, a number of problems are encountered. For example, under the pressures encountered in the high pressure chamber of the intensifier, a piston reciprocating in the chamber tends to be compressed slightly on its pressure stroke, while the housing itself tends to be distended. Thus, even though the manufacturing tolerances are quite close, the clearance between the piston and the housing will vary to some degree (e.g. in the order of several thousandths of an inch), between high and low pressure conditions. Thus, the components of the seal must be so arranged as to accomodate for these changes in clearances, without permitting extrusion of the seal material toward the low pressure side of the seal. This is further complicated by the fact that if the seal is to operate also at much lower pressures, it is usually necessary to utilize in at least some portion of the seal a lower yield strength material which, though it is better able to provide a seal at low pressures, is more easily extrusible at much higher pressure. Yet another problem associated with such high pressure seals is that there are corresponding high interface pressures which tend to cause excessive wear on the sliding faces of the seal.

Another factor is the desirability of making the over all dimensions of the seal as small as possible, especially the radial dimensions. In a high pressure intensifier, the seal typically is fitted in a groove in a high pressure housing. If the seal is made somewhat larger than the desired minimum, the effective pressure cavity of the housing becomes correspondingly larger. When it is considered that each increase in the diameter of the high pressure cavity causes a corresponding increase in the thickness of the walls of the housing to withstand the higher tension forces created by the increased pressure area in the cavity, plus an increase in the circumferential dimension, it can readily be seen that keeping the dimensions of the seal to a desired minimum can create a savings in over all size and weight of the unit. (For example, doubling the diameter of the pressure cavity would increase the mass of the housing by four times.) Yet another consideration is that the seal desirably should be so arranged that it does not require extremely close manufacturing tolerances in manufacture of the component parts of the seal and of the apparatus in which the seal is to be installed.

Typical of the seals known in the prior art are those shown in the following patents: Thompson et al, U.S. Pat. No. 2,905,489; Gage, U.S. Pat. No. 3,003,797; Scannell, U.S. Pat. No. 3,071,389; Mayer, U.S. Pat. No. 3,210,087; Shepler, U.S. Pat. No. 3,300,225; Shepler, U.S. Pat. No. 3,351,350; Gullick, U.S. Pat. No. 3,469,853; Josephson, U.S. Pat. No. 3,521,893; Beroset, U.S. Pat. No. 3,606,356; and Traub, U.S. Pat. No. 3,718,338.

SUMMARY OF THE INVENTION

The seal assembly of the present invention is adapted to provide a high pressure seal at an interface between first and second relatively moving members, such as a piston and a housing. The seal assembly has a front high pressure side and a rear low pressure side, and comprises a first rear substantially rigid backup ring fixedly mounted to the second member, a second relatively high strength seal ring forward of the backup ring, a third relatively low yield strength seal ring forward of the second ring, and a compressible loading ring mounted in a recess of the third ring to cause the third ring to be pressed into sealing relationship.

In the preferred form, the backup ring is positioned between two connecting portions of the second member, in a manner that during initial assembly when the two portions are spaced further apart, the lateral position of the backup ring can be adjusted to accomodate for any misalignment in the component parts. This permits a close tolerance fit between the center opening of the backup ring and the first member (i.e. piston) without necessitating close alignment of the circumference of the backup ring with the other components. An anti-extrusion ring is provided around the second ring member to prevent extrusion between the backup ring and the second member. Desirably, the recess formed in the third ring for the loading ring is provided at the outer forward edge of the third ring so that the compressible loading ring bears against the second member and presses the forward portion of the third ring into sealing engagement with the first member so as to provide adequate sealing at lower pressures.

Other features of the present invention will become apparent from the following detailed description.

DESCRIPTION OF THE PREFERRED EMBODIMENT

Figure 1:
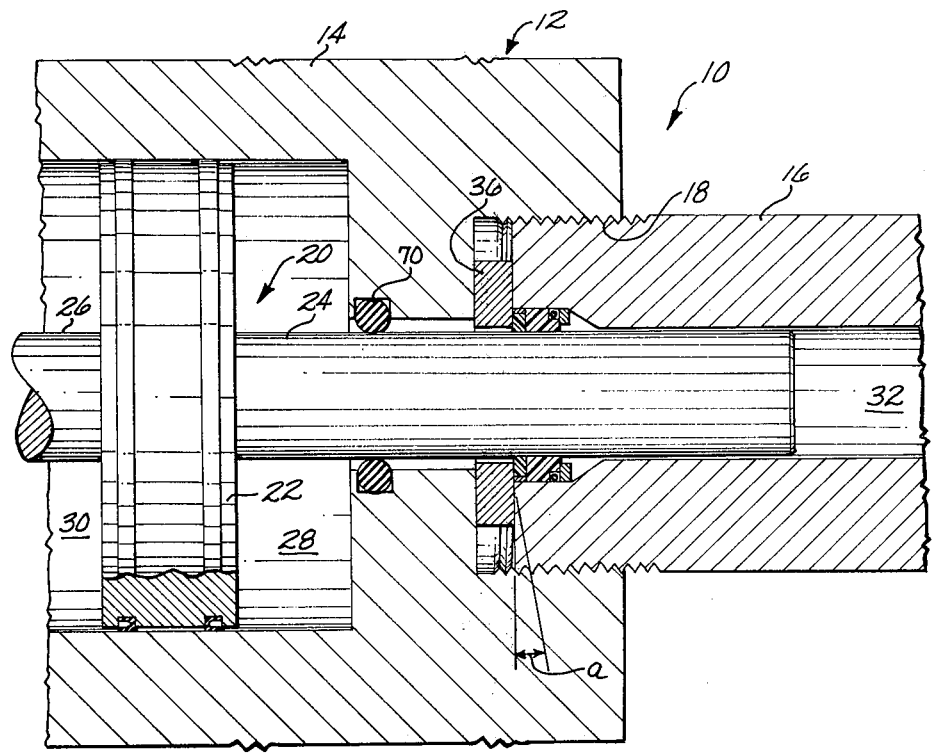
FIG. 1 is a longitudinal sectional view of a high pressure fluid intensifier incorporating the seal of the present invention.
Figure 2:
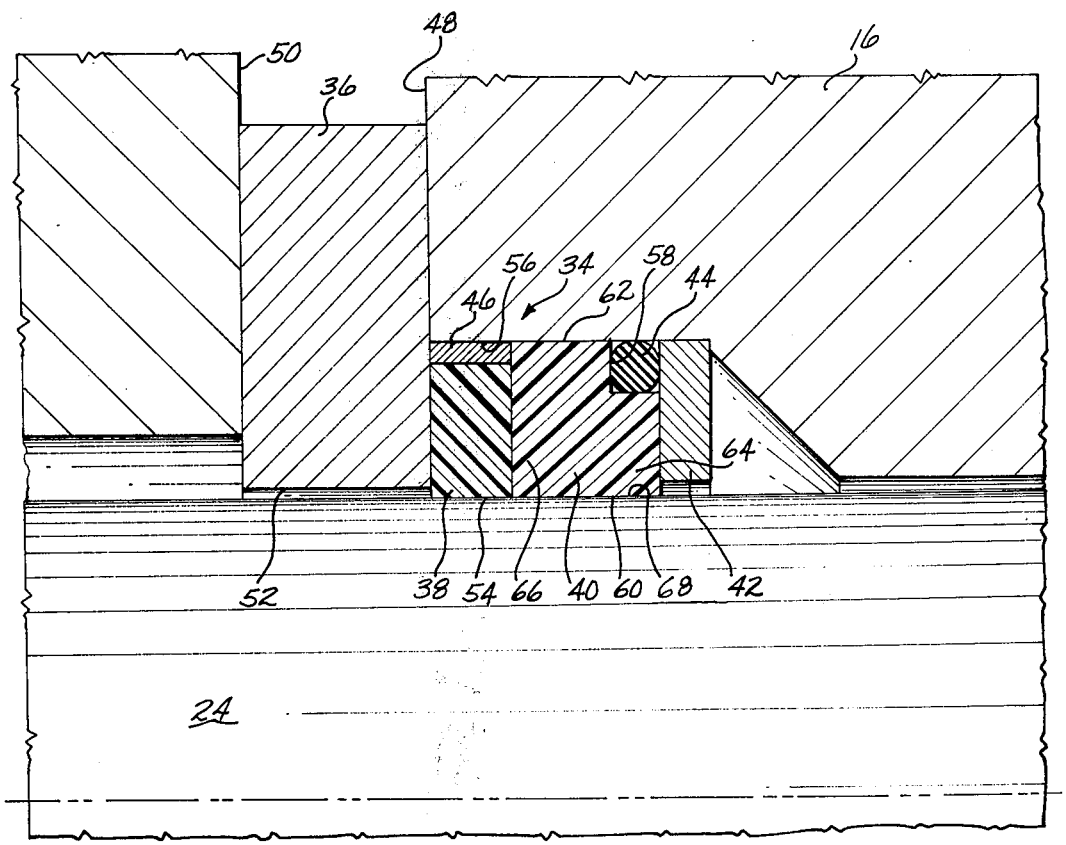
FIG. 2 is a longitudinal sectional view of the seal assembly of the present invention.

The present invention is particularly adapted for use in a high pressure intensifier, such as that illustrated in FIG. 1 of the accompanying drawing. This intensifier 10 comprises a main housing structure 12 which in turn is made up of a main cylinder 14 and a pair of oppositely positioned cylinders, one of which is shown at 16, threadedly mounted at 18 in a related end of the main cylinder 14. Mounted for reciprocating motion within the housing 12 is a unitary piston assembly 20. This assembly 20 comprises a larger diameter central working piston 22 mounted within the main cylinder 14 and right and left high pressure pistons 24 and 26, respectively, extending oppositely from the center working piston 22. The working piston 22 divides the interior of the main cylinder 14 into right and left working chambers 28 and 30, respectively. The right high pressure piston 24 reciprocates in a right high pressure chamber 32 defined by the right cylinder 16 while the left high pressure piston 26 reciprocates in a related left high pressure chamber (not shown in the accompanying drawing for convenience of illustration).

The seal of the present invention is generally designated 34 and in the present embodiment is positioned at the interface between the right high pressure piston 24 and the housing 12 so as to provide a fluid seal between the high pressure chamber 32 and the working chamber 28. In describing the seal 34, the term "front" or "forward" is used to designate proximity to the working chamber 32, while the term "rear" is used to designate proximity to the working chamber 28. The longitudinal axis of the seal 34 is considered to be coincident with the longitudinal axis and direction of travel of the high pressure piston 24, while the transverse axis is considered as lying in a plane perpendicular to the longitudinal axis of the piston 24.

The main components of the seal assembly 34 comprise a rear backup ring 36, a relatively high yield strength seal ring 38 positioned next to and forward of the backing ring 36, a relatively low yield strength seal ring 40 positioned against and just forward of the ring 38, a forward retaining ring 42, a compressible O-ring 44 and an anti-extrusion ring 46 positioned around the ring 38.

The backup ring 36 is substantially rigid and functions to retain the seal assembly 34 in place against the force exerted by the fluid in the high pressure chamber 32. The ring 36 is desirably made of a metal which will not tend to gall on the steel piston, such as a copper beryllium alloy. The outer portion of the ring 36 is positioned between the rearwardly directed transverse face 48 of the cylinder 16 and an opposing transverse face 50 of the main housing section. Thus, as the clylinder 16 is threaded into the main housing section 14, the backup ring 36 becomes fixedly positioned in the housing 12 between the surfaces 48 and 50. The inside diameter of the ring 36 is made very nearly the same as, or just slightly larger than, the outside diameter of the piston 24 within close tolerances (e.g. 0.00000 inches to 0.002 inches). During initial installation, the ring 36 is fitted over the piston 24, after which the cylinder 16 is threaded fully into the housing 14 so as to lock the backup ring 36 in place. Thus, if there is any misalignment between the housing sections 14 and 16 with respect to the piston 24 and the center hole of the ring 36 defined by the inside surface 52 thereof, compensation for such misalignment is accomplished by small lateral adjustment of the backup ring 36 prior to being locked in place in final assembly. In the accompanying drawing, the gap between the inside surface 52 of the ring 36 and the piston 24 is for purposes of illustration, shown proportionately larger than it would normally be, it being understood that this is a close fit. To insure proper engagement of the backup ring 36 with the cylinder surface 48 at the area of the seal assembly, the housing face 48 may be made with a moderate forward radial taper. To illustrate the direction of the angle of taper, in FIG. 1, there is shown angle $a$, which for purposes of illustration is made somewhat larger than the actual angle of taper, which would be in the order of about 1°.

The second relatively high yield strength seal ring 36 is made of a seal material which will yield only moderately under high pressure, and which is capable of making a proper seal with an adjoining surface under high pressure. Such a material is a high yield strength plastic such as a suitable polycarbonate (e.g. Lexan). The inside diameter of the ring 36 is made substantially the same as the outside diameter of the piston 24, so that the inside bearing surface 54 of the ring 38 has a very close fit or slight interference fit with the piston 24.

The anti-extrusion ring 46 is a substantially rigid ring, made of steel or some other suitable metal. With high working pressures in the chamber 32, there is a tendency for a certain amount of "breathing" between the backup ring 36 and the cylinder 16. The ring 46 is pressed against the backup ring 36 by high pressure in the chamber 32 acting through the ring 40 to prevent any extrusion of the seal ring 38 into the space between the backup ring 36 and the cylinder 48. Further, the pressure from the ring 40 against the ring 38 causes the ring 38 to press outwardly against the ring 46 so that the ring 46 fits closely against a recessed surface portion 56 of the cylinder 16, which surface portion 56 defines a seal cavity to receive the components 38–46 of the seal assembly 34.

The low yield strength seal ring 40 has a generally square or rectangular configuration and is provided with an annular recess or cutout 58 at its forward radially outward edge. This recess 58 accomodates the O-ring 44. The seal ring 40 has an inner seal surface 60 to engage the piston 24 and an outer seal surface 62 which engages the surface portion 56 of the cylinder 16. The seal ring 40 is made of a material which will yield sufficiently under lower pressures to engage its adjoining surfaces in sealing relationship. A material suitable for the ring 40 is tetrafluoroethylene (i.e. Teflon), filled with a strengthening material such as graphite or powdered metal. As used herein, the term "yield strength" is used with respect to a material's quality of yielding elastically under pressure, rather than to yielding with a permanent deformation of the material.

The O-ring 44 is a conventional compressible rubber O-ring having a relatively low yield strength. This O-ring 44 is compressed into the area defined by the cavity 58 of the ring 40 and the seal surface 56 of the cylinder 16. Thus the ring 44 presses inwardly against the forward radially inward portion 64 of the ring 40 to cause the forward portion of the ring surface 60 to press against the piston 24. This compressing or loading action of the O-ring 44 causes the interface of the ring surface 60 to seal against the piston 24 under the low pressure conditions that occur during initial pressurization of the chamber 32. In some applications it is desirable to make the O-ring 44 larger, relative to the ring 40, than shown in the accompanying drawing.

As mentioned previously, that portion 66 of the seal ring 40 that is positioned rearwardly of the O-ring 44 extends from the piston 24 to the housing seal surface 56. This full depth of the material that makes up the ring 40 better enables the ring 40 to withstand the very substantial forces resulting from the piston 24 reciprocating with very high pressure in the chamber 32.

The front retaining ring 42 essentially serves the function of retaining the seal components 38, 40, 44 and 46 in proper position. The ring 42 is conveniently made of a suitable metal. As an alternate to the ring 42, the inside diameter of the cylinder 16 can be made moderately larger, and a sleeve placed therein to retain the seal assembly 34 in place.

When the high pressure intensifier 10 is operating, on each half cycle the piston assembly 20 travels to the right, with the high pressure piston 24 moving into the chamber 32 and creating very high pressures (in the order of 50,000 to 100,000 pounds per square inch). At the initial portion of this pressure stroke, in that fraction of a second when the pressure in the chamber 32 is just starting to build up, the O-ring 44 pressing against the forward portion 64 of the low yield strength ring 40 creates a seal interface at both the housing surface 56 and the side surface 68 of the piston 24. As the pressure increases in the chamber 32, the pressure against the forward face of the forward seal ring 40 tends to compress the ring 40 axially. This causes a corresponding lateral pressure of the seal surfaces 60 and 62 against surfaces 56 and 66 to create adequate seal interfaces. The close fit of the retaining ring 46 against the surface 56 of the housing 16 is insured by the axial compression of the ring 38 causing the ring 38 to press radially outwardly against the ring 46. This prevents any of the material of the ring 40 from extruding between the ring 46 and the housing 16, and it also prevents any extrusion of the material of the ring 40 between the ring 38, and the ring 46. Since the ring 38 is made of a relatively high yield strength material, there is no extrusion of the ring 38 into the very small space between the backup ring 36 and the piston 24.

As mentioned previously herein, since in initial installation the ring 36 can be adjusted laterally to accomodate any misalignment with respect to the piston 24, ring 36 and housing portions 14 and 16, it is possible to maintain a quite close tolerance between the inside surface 52 of the ring 36 and the piston 24 without requiring this same close tolerance with the other components. To prevent fluid leakage from the working chamber 28 along the piston 24, a conventional seal can be provided rearwardly of the seal assembly 34 of the present invention. Such a conventional seal is indicated somewhat schematically at 70 in FIG. 1.

What is claimed is:

1. A high pressure seal assembly to seal an interface between two relatively moving members, such as in a high pressure piston and housing assembly, said first member having a first sliding seal surface to engage said seal assembly and movable relative to said seal assembly, said second member having a second stationary seal surface to engage said assembly and being stationary with respect to said seal assembly, said seal assembly having a forward high pressure side and a rear low pressure side, said seal assembly comprising:
   a. a first rear substantially rigid backup ring means fixedly mounted to said second member,
   b. a second relatively high yield strength seal ring means positioned between said first and second surfaces and forward of said backup ring means, said second ring means fitting closely against said first surface,
   c. a third relatively low yield strength seal ring means positioned between said first and second surfaces and forward of said second ring means, said third ring means having a first sliding seal surface in constant sealing engagement with said first surface of the first member, and a second stationary seal surface engaging said second surface of the second member,
   d. said third ring means having an annular recess formed in said third ring means, and
   e. a fourth compressible ring means compressibly mounted in said annular recess, so that said fourth ring means is pressing at least a portion of said third ring means laterally into constant engagement with the first surface of the first member, so as to create a seal therewith during a condition of lower pressure at said seal high pressure side.

2. The seal assembly as recited in claim 1, wherein said backup ring means is laterally adjustable with respect to said second member, whereby misalignment of components can be compensated for by lateral adjustment of said first backup ring means, while maintaining a close tolerance between said backup ring means and said first member.

3. The seal assembly as recited in claim 2, wherein said second member comprises first and second portions adapted to interengage with one another to provide an annular recess to receive said backup ring means, said first and second portions having a preassembly position permitting lateral adjustment of said backup ring means and a final assembled position where said backup ring means is fixedly retained in position in the seal assembly.

4. The seal assembly as recited in claim 2, further comprising an anti-extrusion ring of a substantially rigid material positioned radially outwardly of said second ring means and functioning to contain said second ring means from extruding into an area between said backup ring means and said second member.

5. The seal assembly as recited in claim 1, further comprising a forward retaining member to engage the forward end of said seal assembly so as to hold the components thereof properly in place.

6. The seal assembly as recited in claim 1, wherein said annular recess is formed in a forward portion of said third ring means, with said compression ring means thus forcing the forward portion of said third ring means into sealing engagement with the first member.

7. The seal assembly as recited in claim 6, wherein said annular recess is further positioned adjacent said second member, whereby said compression ring means presses from said second member inwardly against a forward radially inward portion of said third ring means.

8. The seal assembly as recited in claim 1, wherein:
   a. said second member comprises first and second portions adapted to interengage with one another to provide an annular recess to receive said backup ring means, said first and second portions having a preassembly position permitting lateral adjustment of said backup ring means and a final assembled position where said backup ring means is fixedly retained in position in the seal assembly, whereby misalignment of components can be compensated for by lateral adjustment of said first backup ring, while maintaining a close tolerance between said backup ring means and said first member,
   b. said assembly further comprising an anti-extrusion ring of a substantially rigid material positioned radially outwardly of said second ring means and functioning to contain said second ring means from extruding into an area between said backup ring means and said second member,
   c. said apparatus further comprising a forward retaining member to engage the forward end of said seal assembly so as to hold the components thereof properly in place, and
   d. said annular recess being formed in a forward radially outward edge portion of said third seal ring means, whereby said compression ring means presses from said second member inwardly against a forward radially inward portion of said third ring means.

* * * * *